United States Patent [19]

Noomen et al.

[11] Patent Number: 4,772,680

[45] Date of Patent: Sep. 20, 1988

[54] LIQUID COATING COMPOSITION AND A PROCESS FOR COATING A SUBSTRATE WITH SUCH COATING COMPOSITION

[75] Inventors: Arie Noomen, Voorhout; Paul M. Vandevoorde, Sassenheim; Jaap M. Akkerman, Haarlem, all of Netherlands

[73] Assignee: Akzo N.V., Netherlands

[21] Appl. No.: 844,413

[22] Filed: Mar. 26, 1986

[30] Foreign Application Priority Data

Mar. 29, 1985 [NL] Netherlands .................. 8500953

[51] Int. Cl.$^4$ .............. C08G 12/00; C08G 59/44
[52] U.S. Cl. .................................. 528/229; 528/107; 528/121; 528/122; 528/228; 528/246; 525/110; 525/113; 525/118
[58] Field of Search ............... 528/228, 229, 246, 107, 528/121, 122; 525/110, 113, 118

[56] References Cited

U.S. PATENT DOCUMENTS

| | | | |
|---|---|---|---|
| 3,668,183 | 6/1972 | Hoy et al. | 528/228 |
| 3,937,679 | 2/1976 | Bosso et al. | 524/541 |
| 4,217,396 | 8/1980 | Heckles | 525/386 |
| 4,217,439 | 8/1980 | Heckles | 528/228 |
| 4,271,237 | 6/1981 | Heckles | 528/228 |
| 4,365,040 | 12/1982 | Eck et al. | 524/823 |
| 4,408,018 | 10/1983 | Bartman et al. | 525/300 |

Primary Examiner—John Kight
Assistant Examiner—Kriellion Morgan
Attorney, Agent, or Firm—Jeffrey S. Boone; Louis A. Morris

[57] ABSTRACT

The invention provides a liquid coating composition curable at ambient temperature comprising an acetoacetate groups-containing addition polymer having a number average molecular weight of 1000–100,000, a glass transition temperature of 250°–370° K., a hydroxyl number of 0–200 and a content of acetoacetate groups of 3,5–45% by weight, the acetoacetate groups being present as ester of hydroxyalkyl acrylate, hydroxyalkyl methacrylate or allyl alcohol structural units, and a polyamine having primary and/or secondary amino groups and blocked with an aldehyde or ketone. A process for coating a substrate with such composition is also provided.

7 Claims, No Drawings

LIQUID COATING COMPOSITION AND A PROCESS FOR COATING A SUBSTRATE WITH SUCH COATING COMPOSITION

The invention relates to a liquid coating composition based on a polyacetoacetate, a polyamine having primary and/or secondary amino groups and blocked with a ketone or an aldehyde having not more than 18 carbon atoms, the blocked polyamine and the polyacetoacetate being present in an amount such that the ratio of the number of equivalents of primary and secondary amino groups of the polyamine to the number of equivalents of acetoacetate of the polyacetoacetate is between ½ and 2. A coating composition of the type indicated above is known from U.S. Pat. No. 3,668,183. It has the disadvantage that the coating composition obtained displays unsatisfactory resistance to water and acids and unsatisfactory resistance to outdoor exposure.

The invention has for its objects to provide a coating composition which does not show these drawbacks and whose other properties are also on a satisfactory level.

The coating composition is characterized in that the polyacetoacetate is an acetoacetate groups-containing addition polymer having a number average molecular weight of 1000–100 000, a glass transition temperature of 250°–370° K., a hydroxyl number of 0–200, and a content of acetoacetate groups of 3,5–45% by weight, the acetoacetate groups being present as ester of hydroxyalkyl acrylate, hydroxyalkyl methacrylate or allyl alcohol structural units.

Examples of suitable acetoacetate groups-containing addition polymers that may be used according to the invention include addition polymers, 4–100% by weight of which consists of an acetoacetic ester of a hydroxyalkyl (meth)acrylate or allyl alcohol monomer unit, 0–96% by weight of an acrylic or methacrylic ester of a mono-, di- or polyfunctional hydroxyl compound having 1–18 carbon atoms, 0–20% by weight of a monoethylenically unsaturated mono- or dicarboxylic acid having 3–12 carbon atoms or an anhydride thereof, and 0–96% by weight of one or more other copolymerizable monomers, such as styrene, α-methyl styrene, vinyl toluene, acrylamide, methacrylamide, acrylonitrile, N-methylol methylol acrylamide, dimethyl maleinate, vinyl acetate, vinyl versatate, vinyl trimethoxy silane and/or allyl glycidyl ether. Suitable monomer units having one or more acetoacetate groups include compounds of the general formula

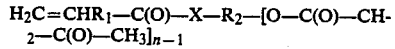

where the group $R_1$ represents a hydrogen atom or a methyl group, the group X an oxygen atom or an NH-group and the group $R_2$ is an n-functional organic group having 1–26 carbon atoms and n is a number of 2–4; the molecular weight of such a monomer unit is generally not higher than 500, preferably 140–300. The n-functional organic group $R_2$ may contain urethane groups, ether groups and/or ester groups, for example obtained from a lactone, such as ε-caprolactone, or an epoxy compound or isocyanate compound such as an alkylene oxide, glycidol, a glycidyl ester of a monocarboxylic acid containing 2–18 carbon atoms or an adduct of a diisocyanate and a diol. These monomer units are obtained for instance by acetoacetylation of an adduct of a lactone, a monoepoxy compound or a diisocyanate reacted with a diol to a hydroxyalkyl (meth)acrylate.

Examles of other suitable monomer units include allyl acetoacetate and acetoacetic esters of ethylenically unsaturated diols or triols such as 2-butene-1, 4-diacetoacetate and (2-methylene acetoacetyl)-1-propene-3-acetoacetate.

Examples of suitable acrylic or methacrylic esters of a mono-, di- or polyfunctional hydroxyl compound include methyl acrylate, methyl methacrylate, ethyl acrylate, hydroxyethyl acrylate, hydroxyethyl methacrylate, propyl acrylate, hydroxypropyl methacrylate, butyl acrylate, butyl methacrylate, hydroxyhexyl acrylate, 2-ethylhexyl acrylate, octyl acrylate, isobornyl acrylate, oleyl acrylate, glycidyl methacrylate or (meth)acryloxypropyl trimethoxysilane.

As examples of suitable monoethylenically unsaturated mono- or dicarboxylic acids containing 3–12 carbon atoms or an anhydride thereof may be mentioned acrylic acid, methacrylic acid, maleic acid, itaconic acid, maleic anhydride, cinnamic acid or dodecenic acid.

The addition polymers may be prepared in any convenient manner, for instance by polymerizing a one or more acetoacetate groups containing monomer, optionally mixed with one or more other monomers, at a temperature of 50°–160° C., in the presence of preferably 0,1–10% by weight of an initiator, calculated on the monomeric compound(s). Examples of suitable initiators include free radical initiators, for instance potassium persulphate, hydrogen peroxide, cumene hydroperoxide, benyoyl peroxide, ditert. butyl peroxide, tert. butylpertrimethyl hexanoate, tert. butyl perbenzoate, azobisisobutyronitrile, azobisvaleronitrile, azobis(2,4-dimethylvaleronitrile). The polymerization is carried out in the presence of water and/or an organic solvent, such as a ketone, an alcohol, an ether, an ester or a hydrocarbon. The polymerization may optionally be carried out by using UV light and in the presence of UV initiators, such as benzil, benzoin ethers and thioxanthone derivatives.

Other suitable acetoacetate groups-containing addition polymers are addition polymers having, for instance hydroxyl groups, a number of which have been converted with a reactive acetoacetate compound or a compound yielding an acetoacetate groups, for instance with diketene. Examples of suitable reactive acetoacetate compounds include alkyl esters of acetylacetic acid, preferably methyl acetoacetate or ethyl acetoacetate. Suitable hydroxyl groups-containing addition polymers include copolymers of a hydroxyalkyl (meth)acrylate such as hydroxyethyl methacrylate, hydroxypropyl methacrylate and/or hydroxybutyl acrylate and optionally one or more other comonomers, and copolymers of styrene and allyl alcohol.

As examples of representative polyamines which according to the invention may be used in aldiminated or ketiminated form as second component of the composition may be mentioned aliphatic or cycloaliphatic amines having 2–10 primary and/or secondary amino groups, preferably 2 to 4 primary amino groups and 2–200 carbon atoms.

Examples of suitable polyamines include ethylenediamine, propylenediamine, butyllenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'- diminodicyclohexyl methane, isophorone diamine, bis(3-methyl-4-aminocyclohexyl)methane, 2,2-bis(4-aminocyclohexyl)propane, nitrile tris(ethane amine), bis(3-aminopropyl) methylamine, 3-amino-1-(methylamino)propane, 3-amino-1-(cyclohexylamino)propane, N-(2-hydroxyethyl)ethylene diamine and polyamines of the formula $H_2N—(R_2—NH)_n—R_1—NH_2$, where the group $R_1$ and the n groups $R_2$ may be the same or different and represent an alkylene group-containing 2–6 and preferably 2–4 carbon atoms and n is a number from 1–6 and preferably 1–3. By an alkylene group is also to be understood here a cycloalkylene group or an alkylene group-containing an ether-oxygen atom. Examples of representative polyalkylene polyamines include diethylene triamine, dipropylene triamine and dibutylene triamine. It is preferred that these polyamines should be of a cycloaliphatic nature and contain 5–15 carbon atoms, such as isophoronediamine; more particularly the last-mentioned polyamines contain an α-aklyl group, such as bis(3-methyl-4-aminocyclohexyl)methane and bis(3-methyl-4-aminocyclohexyl)propane.

Other suitable polyamines are, according to the invention, the adducts of an amino compound to a polyfunctional epoxy, isocyanate, maleinate, fumarate or acryloyl compound or methacryloyl compound.

As examples of suitable epoxy compounds, which as such may be solid or liquid, may be mentioned the di- or polyglycidyl ethers of (cyclo)aliphatic or aromatic hydroxyl compounds, such as ethylene glycol, glycerol, cyclohexane diol, mono- or polynuclear di- or trifunctional phenols, bisphenols such as Bisphenol-A and Bisphenol-F; polyglycidyl ethers of phenol formaldehyde novolak; polymers of ethylenically unsaturated compounds having epoxy groups, such as glycidyl (meth)acrylate, N-glycidyl (meth)acrylamide and/or allylglycidyl ether, and optionally of one or more other copolymerizable ethylenically unsaturated monomers; cycloaliphatic epoxy compounds such as epoxidized styrene or divinyl benzene which may optionally, subsequently, be hydrogenated; glycidyl esters of fatty acids containing, for instance, 6–24 carbon atoms; glycidyl (meth)acrylate; epoxy compounds containing an isocyanurate group; an epoxidized polyalkadiene such as epoxidized polybutadiene; hydantoin-epoxy resins; epoxy resins obtained by epoxidizing aliphatic and/or cycloaliphatic alkenes, such as dipentene dioxide, dicyclopentadiene dioxide and vinyl cyclohexene dioxide, and glycidyl groups-containing resins such as polyesters or polyurethanes containing one or more glycidyl groups per molecule, or mixtures of the above-envisaged epoxy resins. The epoxy resins are known to a skilled person and need not be further described here.

It is preferred that the epoxy resin to be used should be a diglycidyl ether based on bis(4-hydroxyphenyl)-2,2-propane. The preferred epoxy equivalent weight of the epoxy resin(s) is in the range of 87 to 6000, more particularly 120–1000.

Examples of suitable isocyanate compounds include aliphatic, cycloaliphatic or aromatic di-, tri- or tetraisocyanates which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, ω,ω-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane4,4'-diisocyanate, a toluene diisocyanate, 1,3-bis(1-isocyanato1-methylethyl)benzene, 1,4-bis(1-isocyanato-1-methylethyl)benzene, 1,3-bis(isocyanatomethyl)benzene a xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as hexamethylene diisocyanate or isophorone diisocyanate, and a diol such as ethylene glycol, the adduct of 3 molecules of hexamethylene diisocyanate and 1 molecule of water (available under the trademark Desmodur N of Bayer), the adduct of 1 molecule of trimethylol propane and 3 molecules of toluene diisocyanate (available under the trademark Desmodur L of Bayer), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate. Examples of suitable polyfunctional acryloyl compounds or methacryloyl compounds include the (meth)acrylic esters of di-, tri-or polyalent hydroxyl compounds, including polyester diols or polyols and polyether diols or polyols; adducts of on the one hand a hydroxyl group-containing (meth)acrylic ester of a polyol to an at least bifunctional isocyanate compound or epoxy compound on the other; and adducts of (meth)acrylic acid to an at least bifunctional epoxy compound. For brevity, the compounds envisaged here are hereinafter referred to as poly(meth)acryloyl compound. As examples of suitable (meth)acrylic esters of di-, tri- or polyvalent hydroxyl compounds may be mentioned those of ethylene glycol, propylene glycol, diethylene glycol, tetramethylene diol, neopentyl glycol, hexamethylene diol, cyclohexane diol, 4,4'-dihydroxybenzophenone, bis-(4-hydroxycyclohexane)methane, glycerol, trimethylol ethane, trimethylol propane and pentaerythritol. These esters may optionally contain a hydroxyl group. The hydroxyl group-containing (meth)acrylic esters from which the adduct to the at least bifunctional isocyanate compound or epoxy compound may be formed are the (meth)acrylic esters of polyols, such as those defined hereinbefore. As examples of an at least bifunctional isocyanate compound or epoxy compound suitable for the formation of the aforementioned adduct may be mentioned those isocyanate compounds and epoxy compounds already mentioned hereinbefore as component of the adduct of an amine compound to a polyfunctional isocyanate compound or epoxy compound. The poly(meth)acryloyl compound generally has an equivalent weight of 85–5000, preferably of 100–1000.

For use in the coating composition according to the invention the amino groups of the above-described polyamines are blocked with an aldehyde or ketone having not more than 18 carbon atoms, preferably 3–10 carbon atoms. Examples of suitable blocking agents for the amino groups include acetone, diethyl ketone, methylisobutyl ketone, isobutyraldehyde, hydroxybutyraldehyde, pentanone, cyclohexanone, ethylamyl ketone, hydroxycitronellal, isophorone and decanone. It is preferred that use should be made of an aliphatic or cycloaliphatic ketone with in particular 3-8 carbon atoms. The blocking of the amino groups is known in itself and need not be further described here. The blocked polyamines generally have a number average molecular weight of 250-4000, preferably of 300-2000.

It is preferred that the coating composition should contain a solvent for the polyacetoacetate and the blocked polyamine, but there is no absolute need for that. Suitable examples include water, aliphatic or aromatic hydrocarbons, esters, ethers, alcohols, ketones, diketo compounds such as acetyl ketone and nitroalkanes such as nitropropane, and (cyclo)aliphatic or aromatic esters of acetylacetic acid, of which the (cyclo) alkyl group or the aromatic group has 1-20 carbon atoms, such as ethylacetoacetate, cyclohexylacetoacetate and phenylacetoacetate.

The coating composition may also contain usual additives, such as pigments, fillers, levelling agents, emulsifiers, anti-foaming agents, rheology control agents, reducing agents anti-oxidants, UV-stabilizers, sag control agents and catalysts such as organic carboxylic acids. Optionally, the composition may also contain a compound, such as an acrylate (co)polymer, cellulose acetopropionate, cellulose acetobutyrate, nitrocellulose, a vinyl polymer, an epoxy resin and/or an $\alpha,\beta$-ethylenically unsaturated group-containing compound.

The coating composition may be applied to the substrate in any suitable manner, such as by roller coating, spraying, brushing, sprinkling, flow coating or dipping. It is preferred that the composition should be applied by spraying.

Suitable substrates include those of pretreated or non-pretreated metals, wood, synthetic materials, paper or leather. Suitable metals include iron, steel and aluminium. Curing the applied coating may be carried out very conveniently at a temperature of, say, 0°-30° C. Optionally, a curing temperaure higher than 30° C. may be used, so that the curing time can be reduced. If desired, the composition may also be baked, for instance at a temperature in the range of 60° to 120° C.

The invention will be further described in the following examples, which are not to be construed as limiting the scope of the present invention. The term "parts" used therein refers to "parts by weight" and "%" to "percent by weight". All acid, hydroxyl or acetoacetate numbers and the percentage acetoacetate relate to the solid binder. The resistance of the coating to premium grade petrol and methylethyl ketone was determined after 1 week's drying by placing a wad of cotton wool soaked in the respective solvent and subsequently scratching the coating with a pencil of a 2B hardness. When damage becomes visible after at least respectively 5 minutes' and 3 minutes' contact with premium grade petrol, then the ratings are denoted by excellent and moderate, respectively. For methylethyl ketone the ratings are denoted by, respectively, excellent, satisfactorily, reasonable and moderate, when damage becomes visible after 60, 45, 30 and 15 seconds, respectively.

The polyacetoacetates mentioned in the Examples 1-13 refer to the solutions of polyacetoacetates prepared in the preceding examples.

PREPARATION OF POLYACETOACETATES

Preparation of polyacetoacetate A

In a reactor a mixture of 500 parts of styrene, 250 parts of butyl acrylate, 250 parts of hydroxyethyl methacrylate, 20 parts of benzoyl peroxide (50% active material) and 1172 parts of toluene was heated to a temperature of 100° C., with stirring and in a stream of nitrogen. In five minutes the temperature rose to boiling point (123° C.). After the reaction mixture had been kept at that temperature for 5 hours, another 10 parts of benzoyl peroxide (50% active material) were added and the reaction mixture was kept at boiling temperature for 3 more hours. After the mixture had been cooled to 90° C., 0,8 parts of triethylamine were added, followed by adding over a period of 2 hours 161,6 parts of diketene; then the mixture was still heated for 30 minutes at 90° C. Following cooling a 48%-resin solution was obtained having a viscosity of 30 cPas. The resulting polyacetoacetate A had an acid number of 1,0, an acetoacetae content of 16,6% (acetoacetate number is 92), a number average molecular weight of 14 000 and an equivalent weight of 1280, calculated on the resin solution. The polyacetoacetate A obtained had a calculated glass transition temperature of 293° K.

Preparation of polyacetoacetate B

In a reactor 667 parts of xylene were heated to 120° C., with stirriing and in a stream of nitrogen. Subsequently, over a period of 3 hours there was added a mixture of 93 parts of hydroxypropyl methacrylate, 406 parts of the adduct of diketene to hydroxypropyl methacrylate, 398 parts of methyl methacrylate, 103 parts of butyl acrylate and 7,5 parts of azobis(dimethylvaleronitrile). The reaction was continued for 1 hour at 120° C., after which a solution in 70 parts of xylene of 2,3 parts of axobis(dimethylvaleronitrile) was added over a period of 30 minutes. After the reaction mixture has been kept at the same temperature for 1 hour, a solution in 20 parts of diisobutyl ketone of 1 part to azobis(dimethylvaleronitrile) was added over a period of 30 minutes and the reaction mixture was kept at a temperature of 120° C. for 1 hour. This last cycle was repeated once more before, upon cooling, a 49%-resin solution having a viscosity of 175 cPas was obtained. The resulting polyacetoacetate B had an acid number of 3,5, an acetoacetae content of 18,0% (acetoacetate number of 100), a hydroxyl number of 40, a number average molecular weight of 6100 and an equivalent weight of 1160, calculated on the resin solution. The polyacetoacetate B had a calculated glass transition temperature of 323° K.

Preparation of polyacetoacetate C

In a reactor 300 parts of styrene-allyl alcohol copolymer (available under the trademark RJ 100 of Monsanto), 195 parts of ethyl acetoacetate, 1,5 parts of dibutyltin oxide and 200 parts of xylene were heated to 120° C., with stirring and in a stream of nitrogen. Over a period of 2½ hours, 44,7 parts of ethanol were removed by distillation; in the same period the reactor temperature rose to 145° C. All volatile constituents were removed by vacuum distillation. Then 200 parts of xylene were added. Following cooling a 70%-resin solution was obtained having a viscosity of 150 cPas. The resulting polyacetoacetate C had an acid number of 1,3, an acetoacetate content of 23,4% (acetoacetate number of 130), a number average molecular weight of 1800 and an equivalent weight of 614, calculated on the resin solution.

Preparation of polyacetoacetate D

In a reactor 684 parts of xylene were heated to boiling temperature (140° C.), with stirring and in a stream of nitrogen. Subsequently, over a period of 3 hours, 350 parts of styrene, 325 parts of butyl acrylate, 271 parts of hydroxyethyl methacrylate, 54 parts of methyl methacrylate and 25 parts of tert. butyl perbenzoate were added, followed by 3 hours' heating with refluxing. After cooling to 100° C. 5,1 parts of dibutyltin oxide and 271 parts of ethyl acetoacetate were added, after which the mixture was heated to 120° C. Over a period of 8 hours, 139 parts of a mixture of ethanol and xylene were removed by distillation, with the reactor temperature rising to 140° C. After the mixture had been cooled, a 64%-solution of polyacetoacetate D was obtained having a viscosity of 200 cPas. The resulting polyacetoacetate D had an acid number of 4,0, an acetoacetate content of 17,5% (acetoacetate number is 97), a number average molecular weight of 4600 and an equivalent weight of 1280, calculated on the resin solution. The polyacetoacetate D had a calculated glass transition temperature of 286° K.

Preparation of polyacetoacetate E

The polyacetoacetate E was prepared in the same was as the polyacetoacetate D, except that use was made of 667 parts of xylene, 271 parts of hydroxyethyl methacrylate, 350 parts of styrene, 47 parts of butyl acrylate, 332 parts of methyl methacrylate, 7,5 parts of tert. butyl perbenzoate, 271 parts of ethyl acetoacetate and 2 parts of dibutyltin oxide.

A 49%-resin solution was obtained having a viscosity of 420 cPas. The polyacetoacetate E had an acid number of 2,8, an acetoacetate content of 18,2% (acetoacetate number of 101), a number average molecular weight of 11 000 and an equivalent weight of 1140, calculated on the resin solution. The polyacetoacetate E had a calculated glass transition temperature of 329° K.

Preparation of polyacetoacetate F

In a reactor 667 parts of xylene and 356 parts of ethyl acetoacetate were heated to 120° C., with stirring and in a stream of nitrogen. Subsequently, over a period of 3 hours there was added a mixture of 470 parts of hydroxyethyl methacrylate, 379 parts of methyl methacrylate, 150 parts of butyl acrylate and 7,5 parts of azobis(dimethylvaleronitrile). The reaction was continued for ½ hour at 120° C., after which a solution in 70 parts of xylene of 2,5 parts of azobis(dimethylvaleronitrile) was added over a period of 30 minutes. After the reaction mixture had been kept at the same temperature for 1 hour, a solution in 20 parts of diisobutyl ketone of 1 part of azobis(dimethylvaleronitrile) was added over a period of 30 minutes and the reaction mixture was kept at a temperature of 120° C. for 1 hour. This last cycle was repeated once more before, upon cooling to 100° C., 2 parts of dibutyltin oxide were added. After heatiing to 120° C. 152 parts of a mixture of ethanol and xylene were removed by distillation over a period of 4 hours, with the reaction temperature rising to 144° C. After cooling and adding 263 parts of xylene a 55%-resin solution of the polyacetoacetate F was obtained having a viscosity of 525 cPas. The resulting polyacetoacetate had an acid number of 5,0, a hydroxyl number of 40, an acetoacetate content of 22,5% (acetoacetate number of 125), a number average molecular weight of 6500 and an equivalent weight of 822, calculated on the resin solution. The polyacetoacetate F had a calculated glass transition temperature of 303° K.

Preparation of polyacetoacetate G

The polyacetoacetate G was prepared in the same way as the polyacetoacetate F, except that use was made of 667 parts of xylene, 273 parts of ethyl acetoacetate, 382 parts of hydroxyethyl methacrylate, 436 parts of styrene, 183 parts of butyl acrylate and 50 parts of azobis(dimethylvaleronitrile).

A 59%-resin solution was obtained having a viscosity of 85 cPas. The polyacetoacetae G had an acid number of 2,8, a hydroxyl number of 40,9, an acetoacetate content of 18,0% (acetoacetate number of 100), a number average molecular weight of 3400 and an equivalent weight of 960, calculated on the resin solution. The polyacetoacetate G had a calculated glass transition temperature of 303° K.

Preparation of polyacetoacetate H

The polyacetoacetate H was prepared in the same way as the polyacetoacetate F, except that use was made of 667 parts of xylene, 273 parts of ethyl acetoacetate, 382 parts of hydroxyethyl methacrylate, 404 parts of styrene, 183 parts of butyl acrylate, 32 parts of acrylic acid and 50 parts of azobis(dimethylvaleronitrile).

A 61%-resin solution of polyacetoacetate H was obtained having a viscosity of 250 cPas. The polyacetoacetate H had an acid number of 19,8, a hydroxyl number of 40,9, an acetoacetate content of 18,0% (acetoacetate number of 100), a number average molecular weight of 3400 and an equivalent weight of 970, calculated on the resin solution. The polyacetoacetate H had a calculated glass transition temperature of 330° K.

Preparation of polyacetoacetate I

The polyacetoacetate I was prepared in the same way as the polyacetoacetate F, except that use was made of 884 parts of toluene, 116 parts of ethyl acetoacetate, 139 parts of hydroxyethyl methacrylate, 296 parts of butyl methacrylate, 215 parts of methyl methacrylate, 350 parts of styrene and 2 parts of azobis(dimethylvaleronitrile). The polymerization reaction was carried out at 100° C.; the distillation with refluxing at 115° C. A 45%-resin solution of the polyacetoacetate I was obtained having a viscosity of 325 cPas. The polyacetoacetate I had an acid number of 1,3, a hydroxyl number of 9, an acetoacetate content of 8,3% (acetoacetate number of 46), a number average molecular weight of 30 000 and an equivalent weight of 2670, calculated on the resin solution. The polyacetoacetate I had a calculated glass transition temperature of 311° K.

Preparation of polyacetoacetate J

In a reactor 374 parts of xylene and 299 parts of ethyl acetoacetate were heated to 120° C. with stirring and in a stream of nitrogen. Subsequently, over a period of 3 hours there was added a mixture of 419 parts of hydroxyethyl methacrylate, 55 parts of acrylic acid, 80 parts of methyl methacrylate, 113 parts of butyl acrylate, 33,4 parts of azobis(dimethyl valeronitrile), 101 parts of n-dodecyl mercaptane and 10 parts of xylene. After the reaction mixture had been kept at the same temperature for 1 hour, a solution of 1,67 parts of azobis(dimethyl valeronitrile) in 25 parts of methylisobutyl ketone was added over a period of 30 minutes and the reaction mixture was kept at a temperature of 120° C. for 30 minutes. Subsequently, at 30 minutes' intervals twice a solution of 0,67 parts of azobis(dimethyl valeronitrile) in 10 parts of methylisobutyl ketone was added. After the reaction mixture had been kept at 120° C., for 30 minutes, it was cooled down to 80° C. After 1,34 parts of dibutyltin oxide had been added, the mixture was heated to 120° C. and over a period of 5 hours 145 parts of a mixture of ethanol and xylene were removed by distillation, with the reaction temperature rising to 144° C. Subsequently, the remaining xylene was distilled off under reduced pressure. After cooling and adding 250 parts of propylene glycol monomethyl ether there was obtained an 80%-resin solution of the polyacetoacetate J having a viscosity of 750 cPas. The polyacetoacetate prepared had an acid number of 52, a hydroxyl number of 60, an acetoacetate content of 27% (acetoacetate number of 150), a number average molecular weight of 1200 and a calculated glass transition temperature of 293° K.

To 125 parts of the 80%-resin solution of the polyacetoacetate J there were successively added, with stirring, and at room temperature 11,3 parts of propylene glycol monomethyl ether, 9,5 parts of triethylamine and 82 parts of demineralized water. The resulting aqueous resin solution had a solids content of 43,9% and a viscosity of 90 cPas.

EXAMPLES

EXAMPLE 1

A coating composition was prepared by successively mixing 12,8 parts of polyacetoacetate A, 7 parts of a triketimine built up from the monoketimine of isophorone diamine and methylisobutyl ketimine which has subsequently reacted with 1 equivalent of trimethylol propane triacrylate (50%-solution in methylisobutyl ketone). The resulting composition had a gel time of 15 minutes. Applied in a coating thickness of 52μm (after drying) to a steel panel (Bonder No. 120) and dried at a temperature of 20° the Persoz hardness was 100 seconds after 1 day and 149 seconds after 1 week. After 1 week the coating was perfectly resistant to premium grade petrol and very satisfactorily resistant to methylethyl ketone.

EXAMPLE 2

A coating composition was prepared from 6,1 g of polyacetoacetate C and 7,0 g of the triketimine from Example 1. The composition had a gel time of about 18 hours. The coating composition was applied to a steel panel (Bonder No. 120) in a coating thickness of 68 μm (after drying). After 7 days' drying at 20° C. the resulting coating had a Persoz hardness of 98 seconds. The coating was very satisfactorily resistant to premium grade petrol and reasonably resistant to methylisobutyl ketone.

EXAMPLE 3

A coating composition was prepared from 15,0 g of polyacetoacetate D and 7,3 g of the triketimine from Example 1. The composition had a gel time of 1 hour. The coating composition was applied to a steel panel (Bonder No. 120) in a coating thickness of 70 μm (after drying). After 7 days' drying at 20° C. the coating had a Persoz hardness of 50 seconds and was perfectly resistant to premium grade petrol and reasonably resistant to methylethyl ketone.

EXAMPLE 4

A coating composition was prepared from 10,0 g of polyacetoacetate E and 1,9 g of the isophorone diamine methylisobutyl ketone diketimine (used as 90%-solution in methylisobutyl ketone). The composition had a gel time of 30 minutes. The composition was applied to a steel panel (Bonder No. 120) in a coating thickness of 45 μm (after drying). After one day's drying at 20° C. the resulting coating has a Persoz hardness of 264 seconds. After 7 days' drying the coating had a Persoz hardness of 300 seconds and was perfectly resistant to premium grade petrol and methylethyl ketone.

EXAMPLE 5

A coating composition was prepared from 75,0 g of polyacetoacetate F and 21,4 g of the diketimine from Example 4. The composition had a gel time of 1 hour. Application to a steel panel as a clear top coat in a so-called base coat/clear coat system resulted in a coating of a total thickness of 95 μm (after drying), the clear top coat having a thickness of 40 μm. After 7 days' curing at 20° C. the coating has a Persoz hardness of 107 seconds and an Erichsen elasticity of 8,0 mm. After 7 days the coating was perfectly resistant to premium grade petrol and methylethyl ketone.

EXAMPLE 6

A coating composition was prepared from 20,0 g of polyacetoacetate G and 5,0 g of the diketimine of Example 4. The composition has a gel time of 3 hours. The composition was applied to a steel panel (Bonder No. 120) in a coating thickness of 63 μm (after drying). After 1 day's drying at 20° C. the coating obtained had a Persoz hardness of 198 seconds. After 7 days' drying at 20° C. the coating had a Persoz hardness of 270 seconds and was perfectly resistant to premium grade petrol and methylethyl ketone.

EXAMPLE 7

A coating composition was prepared from 20,0 g of polyacetoacetate G and 4,5 g of the methylisobutyl diketimine of 3,3'dimethyl-4,4'-diaminodicyclohexyl methane (used as 97%-solution in methylisobutyl ketone). The composition had a gel time of 3 hours. The composition was applied to a steel panel (Bonder No. 120) in a coating thickness of 66 μm (after drying). After one day's drying at 20° C. the resulting coating had a Persoz hardness of 152 seconds. After 7 days' drying the coating had a Persoz hardness of 195 seconds and was perfectly resistant to premium grade petrol and satisfactorily resistant to methylethyl ketone.

EXAMPLE 8

A coating composition was prepared from 20,0 g of polyacetoacetate G and 8,1 g of the triketimine based on dimethyl maleinate, 3 moles of isophorone diamine and 3 moles of methylisobutyl ketone. The coating composition had a gel time of 2 hours. The composition was applied to a steel panel (Bonder No. 120) in a thickness of 65 μm (after drying). After one day's drying at 20° C. the coating obtained had a Persoz hardness of 187 seconds. After 7 days' drying the coating had a Persoz hardness of 280 seconds and was perfectly resistant to premium grade petrol and satisfactorily resistant to methylethyl ketone.

EXAMPLE 9

A coating composition was prepared from 28,1 g of polyacetoacetate G and 3,2 g of the dialdimine based on isophorone diamine and hydroxycitronellal. The coating composition was applied to a steel panel (Bonder No. 120) in a thickness of 68 μm (after drying). After 7 days' drying the resulting coating had a Persoz hardness of 248 seconds. The strong coating was perfectly resistant to premium grade petrol and reasonably resistant to methylethyl ketone.

EXAMPLE 10

A coating composition was prepared from 10,0 g of polyacetoacetate B and 2,0 g of the isophorone diamine methylisobutyl ketone diketimine (used as 90%-solution in methylisobutyl ketone). The composition had a gel time of 3 hours. The composition was applied to a steel panel (Bonder No. 120) in a coating thickness of 45 μm (after drying). After one day's drying at 20° C. the resulting coating had a Persoz hardness of 170 seconds. After 7 days drying the coating has a Persoz hardness of 217 seconds and was perfectly resistant to premium grade petrol and satisfactorily resistant to methylethyl ketone.

EXAMPLE 11

A coating composition was prepared from 24,3 g of polyacetoacetate H and 5,3 g of the diketimine from Example 7. The composition had a gel time of 45 minutes. The composition was applied to a steel panel (Bonder No. 120) in a coating thickness of 40 μm (after drying). After 7 days' drying at 20° C. the resulting coating had a Persoz hardness of 308 seconds. The strong coating was perfectly resistant to premium grade petrol and reasonably resistant to methylethyl ketone.

EXAMPLE 12

A coating composition was prepared from 22,8 g of polyacetoacetate I and 2,2 g of the reaction product of 1 mole of the diglycidyl ether of Bisphenol A and 2 moles of the diketimine of dipropylene triamine and methylisobutyl ketone (applied as 65% solution in a mixture of toluene, butanol and methylisobutyl ketone). The composition had a gel time of 2½ hours. The composition was applied to a steel panel (Bonder No. 120) in a coating thickness of 37 μm (after drying). After 15 minutes the resulting coating was already dust-dry and after one day's drying at 20° C. the Persoz hardness was 197 seconds, and after one week increased to 262 seconds. After one week the Erichsen elasticity of the coating was 9,7 mm. After 1 week the coating was perfectly resistant to a 5 minutes' exposure to premium grade petrol.

EXAMPLE 13

An aqueous coating composition was prepared by mixing 21,3 g of the aqueous solution of the polyacetoacetate J neutralized with triethylamine with 5,1 g of the methylisobutyl diketimine of 3,3dimethyl-4,4-diaminodicyclohexyl methane (used as 97% solution in methylisobutyl ketone). The resulting coating composition had a gel time of 1 hour. The composition was applied to a steel panel (Bonder No. 120) in a coating thickness of 50 μm (after drying). After one day's drying at 20° C. the coating obtained had a Persoz hardness of 98 seconds. After 7 day's drying the coating had a Persoz hardness of 203 seconds and was perfectly resistant to premium grade petrol and reasonably resistant to methylethyl ketone.

We claim:

1. A liquid coating composition based on a polyacetoacetate, a polyamine having primary and/or secondary amino groups and blocked with a ketone or an aldehyde having not more than 18 carbon atoms, the blocked polyamine and the polyacetoacetate being present in an amount such that the ratio of the number of equivalents of primary and secondary amino groups of the polyamine to the number of equivalents of acetoacetate of the polyacetoacetate is between ½ and 2, characterized in that the polyacetoacetate is an acetoacetate groups-containing addition polymer having a large average molecular weight of 1000–100 000, a glass transition temperature of 250°–370° K., a hydroxyl number of 0–200, and a content of acetoacetate groups of 3,5–45% by weight, the acetoacetate groups being present as ester of hydroxyalkyl acrylate, hydroxyalkyl methacrylate or allyl alcohol structural units.

2. A coating composition according to claim 1, characterized in that the polyacetoacetate is in addition polymer containing hydroxyl groups, a number of which have been converted with methyl acetoacetate or ethyl acetoacetate.

3. A coating composition according to claim 1, characterized in that in its blocked form the polyamine is an aliphatic or cycloaliphatic amine having 2 to 4 primary amino groups and 2 to 200 carbon atoms.

4. A coating composition according to claim 3, characterized in that.the polyamine is a cycloaliphatic polyamine having 5–15 carbon atoms.

5. A coating composition according to claim 3, characterized in that the polyamine is an adduct of an amine to a diglycidyl ether based on bis(4-hydroxyphenyl)-2,2-propane.

6. A coating composition according to claim 1, characterized in that the polyamine is blocked with an aliphatic or cycloaliphatic ketone having 3–8 carbon atoms.

7. A process of coating a substrate with a liquid coating composition, characterized in that use is made of a coating composition according to any one of the claims 1–6.

* * * * *